US012710323B1

(12) United States Patent
Graff et al.

(10) Patent No.: US 12,710,323 B1
(45) Date of Patent: Aug. 18, 2026

(54) FORCE INPUT PROCESSING AND DYNAMIC FORCE THRESHOLDS

(71) Applicant: Apple Inc., Cupertino, CA (US)

(72) Inventors: David S. Graff, Albany, CA (US); Ananta Palani, Sunnyvale, CA (US); Amsal Jindani, Santa Clara, CA (US); Kshama Kodthalu Shivashankara, San Jose, CA (US); Pradyumna Byappanahalli Suresha, San Jose, CA (US); Ram Avinery, Santa Clara, CA (US); Sarmad M. Siddiqui, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/199,738

(22) Filed: May 6, 2025

Related U.S. Application Data

(60) Provisional application No. 63/643,330, filed on May 6, 2024.

(51) Int. Cl.
*G01L 1/14* (2006.01)
*G06F 3/0354* (2013.01)
*G06F 3/044* (2006.01)

(52) U.S. Cl.
CPC .......... *G01L 1/146* (2013.01); *G06F 3/03545* (2013.01); *G06F 3/0446* (2019.05); *G06F 2203/04104* (2013.01); *G06F 2203/04105* (2013.01)

(58) Field of Classification Search
CPC .... G06F 3/0383; G06F 3/03545; G06F 3/016; G06F 3/041; B43K 29/20; B43K 23/012; G01L 1/146
See application file for complete search history.

(56) References Cited

U.S. PATENT DOCUMENTS

| | | | | |
|---|---|---|---|---|
| 8,348,538 | B2 * | 1/2013 | Van Loenen | B43K 29/08 347/109 |
| 9,395,825 | B2 * | 7/2016 | Lin | G06F 3/041 |
| 9,575,573 | B2 * | 2/2017 | Chang | G06F 3/03545 |
| 9,671,877 | B2 * | 6/2017 | Zerayohannes | G06F 3/03545 |
| 9,946,365 | B2 * | 4/2018 | Cueto | G06F 3/03545 |
| 10,133,370 | B2 * | 11/2018 | Evreinov | G06F 3/03545 |
| 11,440,337 | B2 * | 9/2022 | Kämpf | A61B 5/6891 |
| 11,941,186 | B2 * | 3/2024 | Sakamoto | G06F 3/0383 |
| 12,039,133 | B2 * | 7/2024 | Oh | G06F 3/044 |
| 12,416,984 | B2 * | 9/2025 | Dekel | G06F 3/016 |

(Continued)

FOREIGN PATENT DOCUMENTS

TW 202035178 A * 10/2020 .......... G06F 3/0354

*Primary Examiner* — Olga V Merkoulova
(74) *Attorney, Agent, or Firm* — Kubota & Basol LLP

(57) ABSTRACT

An electronic device includes sensing circuitry coupled to a plurality of force sensors and configured to sense one or more parameters. In some examples, the processing circuitry is coupled to the sensing circuitry and is programmed to combine the one or more parameters sensed at the plurality of electrodes into a combined parameter corresponding to an applied force to a surface of the electronic device and detect force inputs, such as a click event, in accordance with a determination that one or more first criteria are satisfied, the one or more first criteria including a criterion that is satisfied when the combined parameter is at or greater than a first threshold.

20 Claims, 10 Drawing Sheets

(56) References Cited

U.S. PATENT DOCUMENTS

| | | | | |
|---|---|---|---|---|
| 2009/0264713 | A1* | 10/2009 | Van Loenen | G06F 3/011 600/301 |
| 2012/0127088 | A1* | 5/2012 | Pance | G06F 3/04812 345/173 |
| 2014/0253469 | A1* | 9/2014 | Hicks | G06F 3/03545 345/173 |
| 2014/0253522 | A1* | 9/2014 | Cueto | G06F 3/0383 345/179 |
| 2015/0035808 | A1* | 2/2015 | Lin | G06F 3/041 345/179 |
| 2015/0212601 | A1* | 7/2015 | Zerayohannes | G06F 3/03545 345/179 |
| 2015/0363035 | A1* | 12/2015 | Hinckley | G06F 3/04883 345/173 |
| 2016/0179222 | A1* | 6/2016 | Chang | G06F 3/03545 345/179 |
| 2016/0282970 | A1* | 9/2016 | Evreinov | G06F 3/0383 |
| 2020/0094613 | A1* | 3/2020 | Kämpf | B43K 8/003 |
| 2022/0100290 | A1 | 3/2022 | Lehmann et al. | |
| 2023/0077162 | A1* | 3/2023 | Sakamoto | G06F 3/03545 |
| 2023/0236698 | A1* | 7/2023 | Oh | G06F 3/0418 345/173 |
| 2024/0126385 | A1* | 4/2024 | Dekel | G06F 3/016 |
| 2025/0103163 | A1 | 3/2025 | Jain et al. | |

* cited by examiner

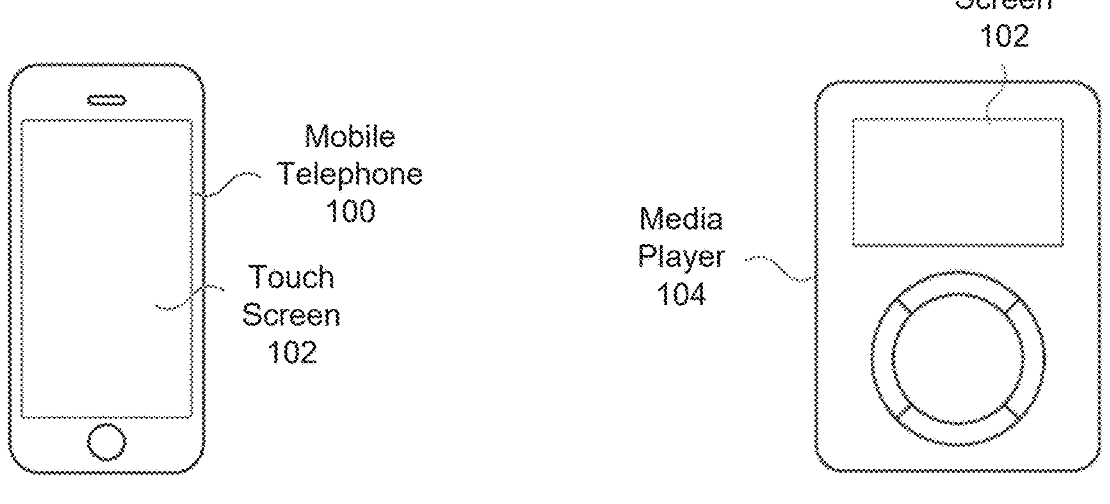
FIG. 1A
FIG. 1B
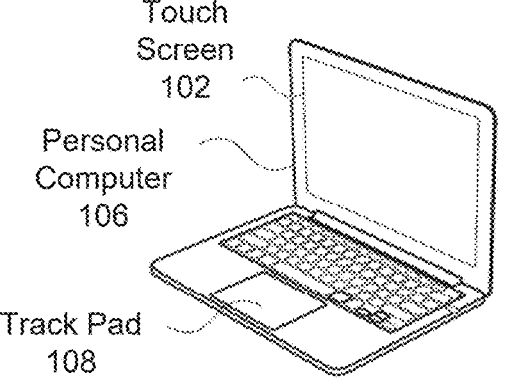
FIG. 1C
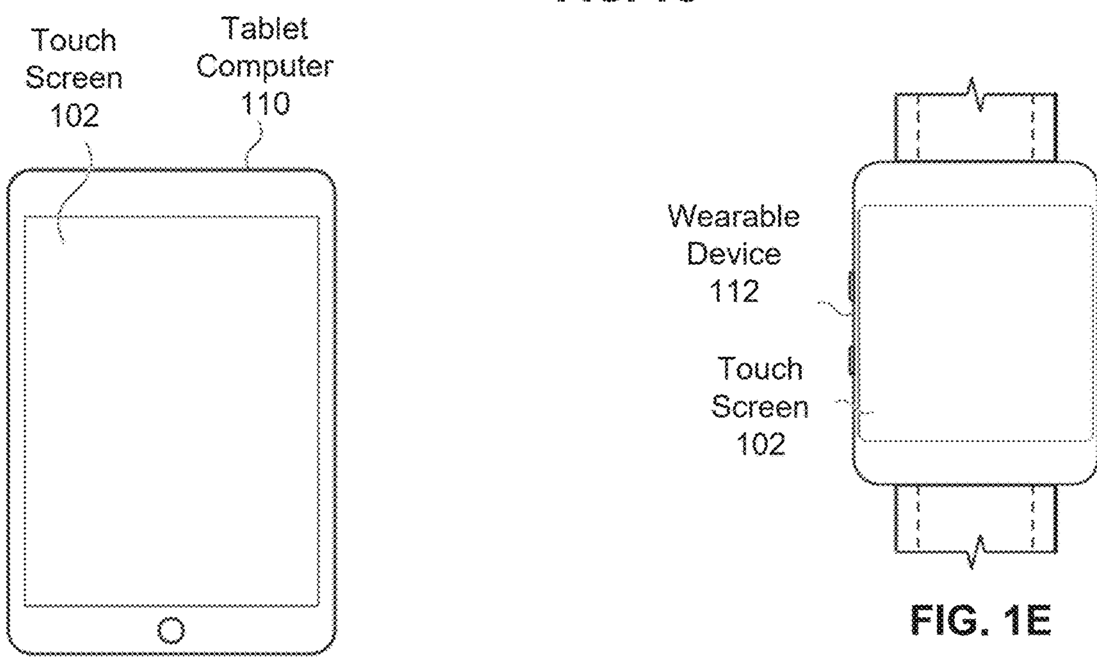
FIG. 1D
FIG. 1E

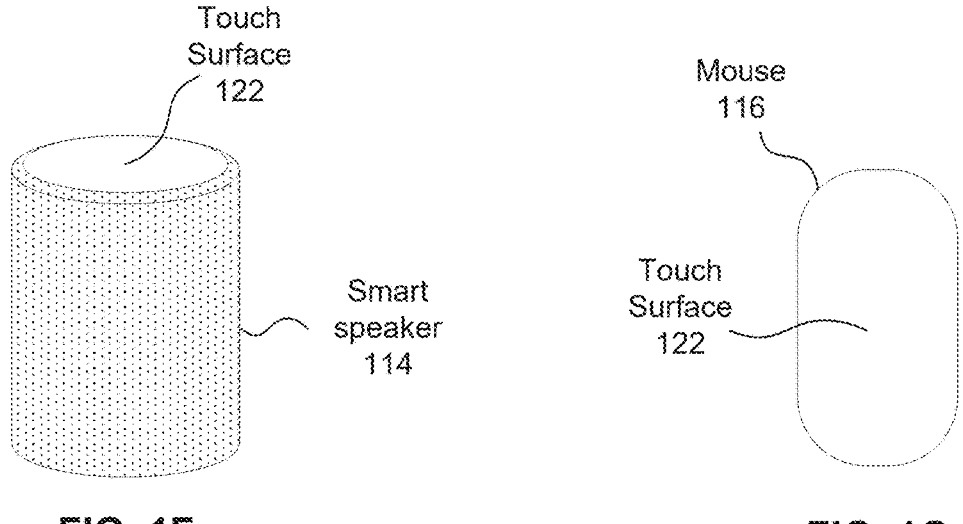
FIG. 1F
FIG. 1G
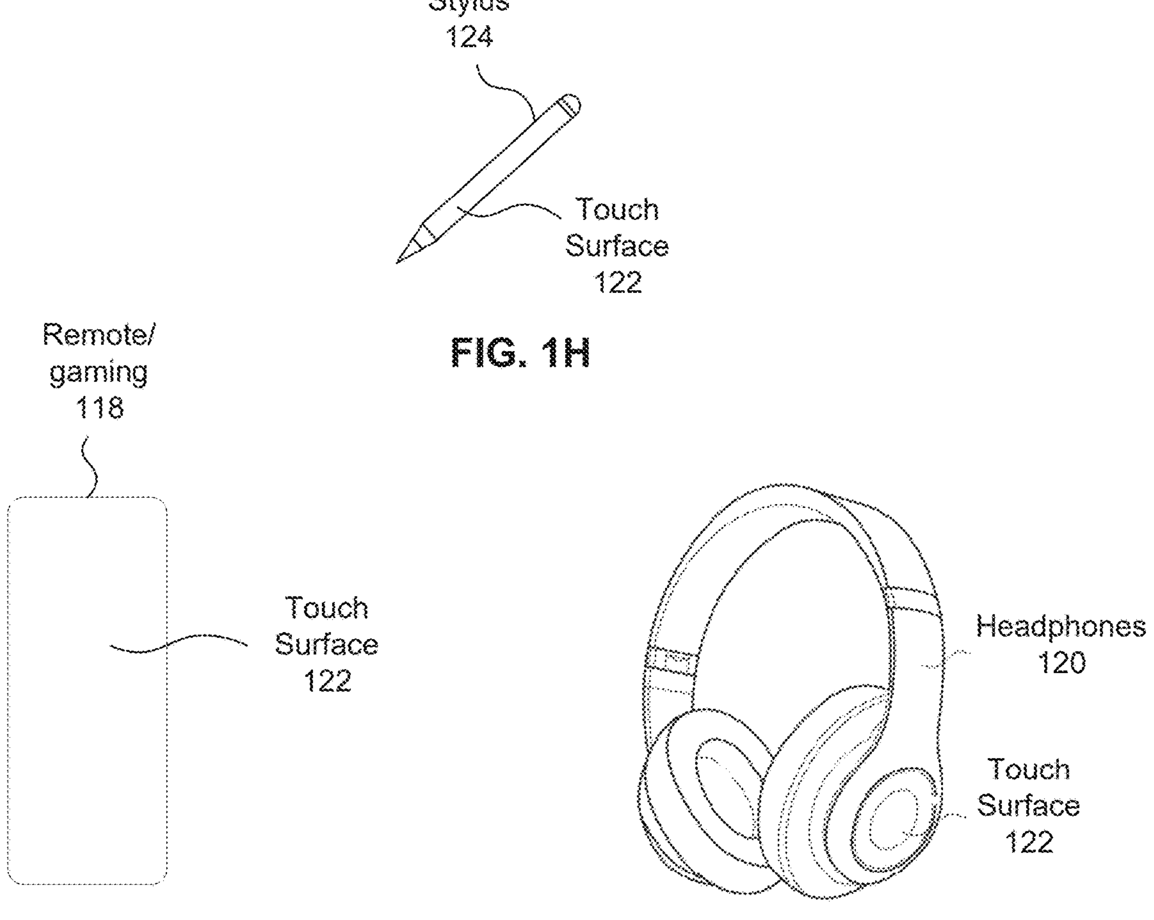
FIG. 1H
FIG. 1I
FIG. 1J

FORCE INPUT PROCESSING AND DYNAMIC FORCE THRESHOLDS

CROSS-REFERENCE TO RELATED APPLICATIONS

This application claims the benefit of U.S. Provisional Application No. 63/643,330, filed May 6, 2024, the content of which is herein incorporated by reference in its entirety for all purposes.

FIELD OF THE DISCLOSURE

This relates generally to an input device, such as a stylus, for providing input to a touch-sensitive surface and/or force-sensitive surface, and more particularly, to techniques for improved processing and accurate detection of force input.

BACKGROUND OF THE DISCLOSURE

Many types of input devices are presently available for performing operations in a computing system, such as buttons or keys, mice, trackballs, joysticks, touch sensor panels, touch screens, styluses and the like. Touch sensor panels, in particular, are popular because of their ease and versatility of operation as well as their price. Capacitive touch sensor panels can be formed from a matrix of conductive plates (e.g., touch electrodes) made of materials such as copper, silver, conductive polymers, metal mesh, graphene, nanowires (e.g., silver nanowires) or nanotubes (e.g., carbon nanotubes). Touch sensor panels can allow a user to perform various functions by touching the touch sensor panel at one or more locations using a finger, stylus or other object. In general, touch sensor panels can recognize a touch and the position of the touch on the touch sensor panel, and the computing system can then interpret the touch in accordance with the position of the touch, and thereafter perform one or more actions based on the touch.

As mentioned above, a stylus is one type of input device that can provide touch input to a device including a touch sensitive surface. Additionally, in some examples, the stylus includes one or more sensors, to augment input to a device including a touch sensitive surface.

SUMMARY OF THE DISCLOSURE

This relates generally to an input device, such as a stylus, for providing input to a touch-sensitive surface and/or force-sensitive surface, and more particularly, to techniques for improved processing and accurate detection of force input. For example, an electronic device (e.g., a stylus) is configured to sense one or more applied forces on the electronic device (e.g., exerted on the barrel of the stylus). The electronic device includes a plurality of force sensors configured to sense one or more parameters (e.g., a force or parameter correlated with force). For example, the electronic device can include a plurality of electrodes and sensing circuitry coupled to these electrodes configured to sense one or more parameters at the plurality of electrodes. In some examples, the device includes processing circuitry coupled to the sensing circuitry. In some examples, the processing circuitry is programmed to combine the parameters sensed at the plurality of electrodes into a combined parameter corresponding to an applied force to a surface of the electronic device. In some examples, the processing circuitry is programmed to detect a click event when the combined parameter is greater than or equal to a first threshold, and to detect an unclick event when the combined parameter is less than or equal to a second threshold. In some examples, the processing circuitry includes a dynamic threshold adjustment mechanism, allowing the device to modify the first threshold and/or the second threshold in real-time based on environmental conditions and/or device interaction patterns. In some examples, the device utilizes a force state machine to manage transitions between operational states such as "click" and "unclick" states based on a combined force parameter and one or more thresholds. In some examples, force inputs are accompanied by haptic, auditory, or visual feedback corresponding to state changes.

BRIEF DESCRIPTION OF THE DRAWINGS

FIGS. 1A-1J illustrate example electronic devices that can include a touch and/or force sensing architecture according to some examples of the disclosure.

DETAILED DESCRIPTION

Figure 2:
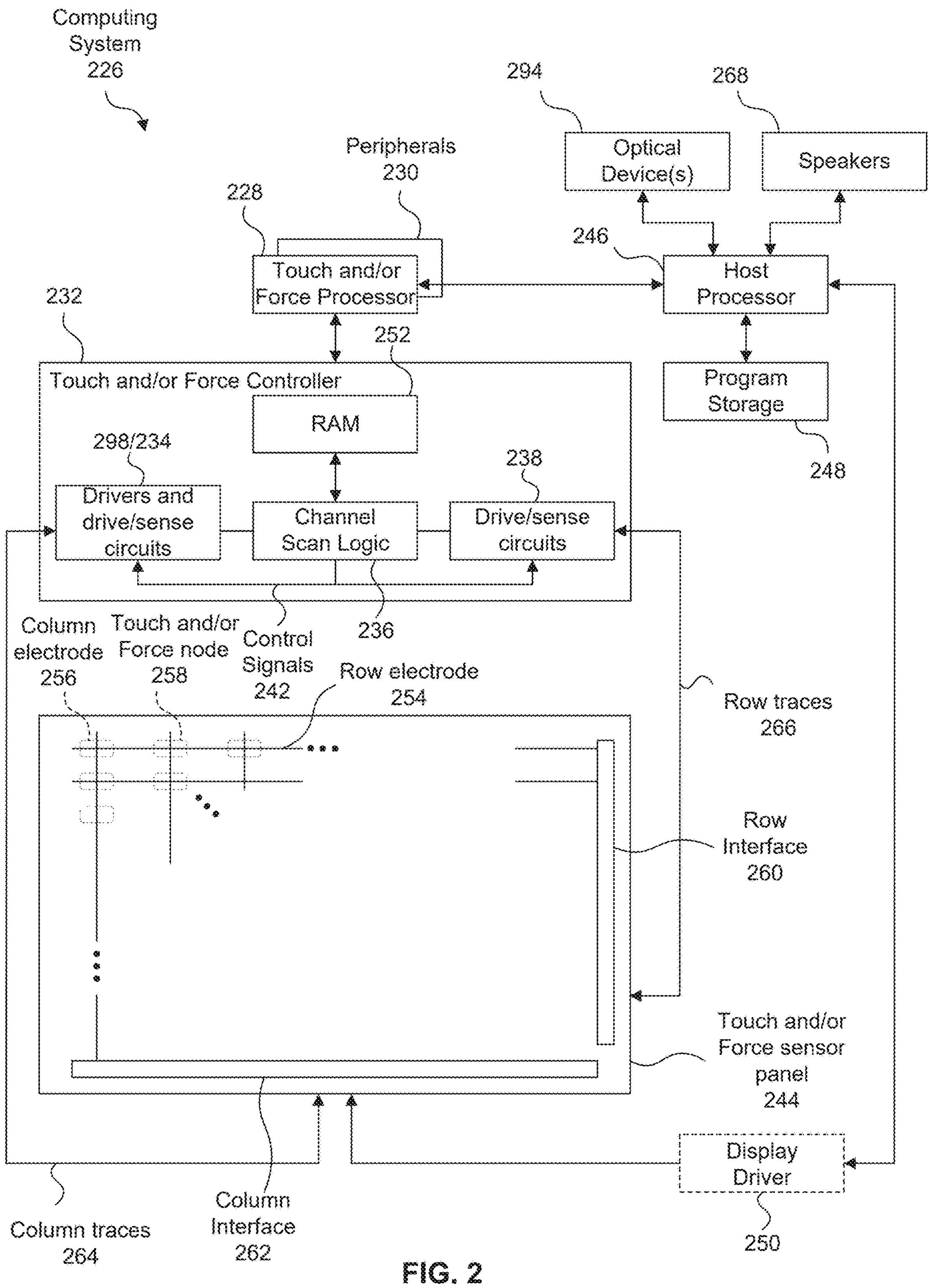
FIG. 2 illustrates an example computing system including a touch and/or force sensing architecture according to some examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to an input device, such as a stylus, for providing input to a touch-sensitive surface and/or force-sensitive surface, and more particularly, to techniques for improved processing and accurate detection of force input. For example, an electronic device (e.g., a stylus) is configured to sense one or more applied forces on the electronic device (e.g., exerted on the barrel of the stylus). The electronic device includes a plurality of force sensors configured to sense one or more parameters (e.g., a force or parameter correlated with force). For example, the electronic device can include a plurality of electrodes and sensing circuitry coupled to these electrodes configured to sense one or more parameters at the plurality of electrodes. In some examples, the device includes processing circuitry coupled to the sensing circuitry. In some examples, the processing circuitry is programmed to combine the parameters sensed at the plurality of electrodes into a combined parameter corresponding to an applied force to a surface of the electronic device. In some examples, the processing circuitry is programmed to detect a click event when the combined parameter is greater than or equal to a first threshold, and to detect an unclick event when the combined parameter is less than or equal to a second threshold. In some examples, the processing circuitry includes a dynamic threshold adjustment mechanism, allowing the device to modify the first threshold and/or the second threshold in real-time based on environmental conditions and/or device interaction patterns. In some examples, the device utilizes a force state machine to manage transitions between operational states such as “click” and “unclick” states based on a combined force parameter and one or more thresholds. In some examples, force inputs are accompanied by haptic, auditory, or visual feedback corresponding to state changes.

FIGS. 1A-1J illustrate example devices that can include a touch and/or force sensing architecture according to examples of the disclosure. FIG. 1A illustrates example mobile telephone 100 that includes touch screen 102 and a touch and/or force sensing architecture according to examples of the disclosure. FIG. 1B illustrates example digital media player 104 that includes touch screen 102 and a touch and/or force sensing architecture according to examples of the disclosure. FIG. 1C illustrates example personal computer 106 that includes touch screen 102 and trackpad 108 and a touch and/or force sensing architecture according to examples of the disclosure. FIG. 1D illustrates example tablet computing device 110 that includes touch screen 102 and a touch and/or force sensing architecture according to examples of the disclosure. FIG. 1E illustrates example wearable device 112 that includes touch screen 102 and a touch and/or force sensing architecture according to examples of the disclosure. FIG. 1F illustrates example smart speaker 114 that includes touch surface 122 and a touch and/or force sensing architecture according to examples of the disclosure. FIG. 1G illustrates example mouse 116 that includes touch surface 122 and a touch and/or force sensing architecture according to examples of the disclosure. FIG. 1H illustrates example stylus 124 that includes touch surface 122 and a touch and/or force sensing architecture according to examples of the disclosure. In some examples, stylus 124 can be used in conjunction with one or more devices described herein, such as mobile telephone 100, digital media player 104, personal computer 106, tablet computing device 110, and/or wearable device 112. FIG. 1I illustrates example remote/gaming control 118 that includes touch surface 122 and a touch and/or force sensing architecture according to examples of the disclosure. FIG. 1J illustrates example headphones 120 that includes touch surface 122 and a touch and/or force sensing architecture according to examples of the disclosure. It is understood that the touch and/or force sensing architecture according to examples of the disclosure can be implemented in other devices as well.

In some examples, touch screen 102, touch surface 122, and trackpad 108 can be based on self-capacitance. A self-capacitance-based touch system can include a matrix of small, individual plates of conductive material or groups of individual plates of conductive material forming larger conductive regions that can be referred to as self-capacitance electrodes. For example, a touch sensor panel can include a plurality of individual self-capacitance electrodes, each self-capacitance electrode identifying or representing a unique location on the touch sensor panel at which touch or proximity is to be sensed, and each self-capacitance electrode being electrically isolated from the other self-capacitance electrodes in the touch sensor panel. Such a touch sensor panel can be referred to as a pixelated self-capacitance touch sensor panel, though it is understood that, in some examples, the electrodes on the touch sensor panel can be used to perform scans other than self-capacitance scans of the touch sensor panel (e.g., mutual capacitance scans). During operation, a self-capacitance electrode can be stimulated with an alternating current (AC) waveform, and the self-capacitance to ground of the self-capacitance electrode can be measured. As an object approaches the self-capacitance electrode, the self-capacitance to ground of the self-capacitance electrode can change (e.g., increase). This change in the self-capacitance of the self-capacitance electrode can be detected and measured by the touch sensing system to determine the positions of multiple objects when they touch, or come in proximity to, the touch sensor panel. In some examples, the self-capacitance electrodes of a self-capacitance-based touch system can be formed from rows and columns of conductive material, and changes in the self-capacitance to ground of the rows and columns can be detected, similar to above. In some examples, a touch sensor panel can be multi-touch, single touch, projection scan, full-imaging multi-touch, capacitive touch, etc.

In some examples, touch screen 102, touch surface 122, and trackpad 108 can be based on mutual capacitance. A mutual capacitance-based touch system can include electrodes arranged as drive and sense electrodes that may cross over each other on different layers (in a double-sided configuration), or may be adjacent to each other on the same layer. The crossing or adjacent locations can form a matrix of mutual capacitance touch pixels. During operation, the drive electrode can be stimulated with an AC waveform and the mutual capacitance of the sense electrode can be measured. As an object approaches the touch pixel, the mutual capacitance of the touch pixel can change (e.g., decrease). This change in the mutual capacitance of the touch pixel can be detected and measured by the touch sensing system to determine the positions of multiple objects when they touch, or come in proximity to, the touch screen.

In some examples, touch screen 102, touch surface 122, and trackpad 108 can be configurable to perform mutual capacitance or self-capacitance touch sensing. The electrodes can be arranged as a matrix of small, individual plates of conductive material or as drive and sense electrodes, or in another pattern. The electrodes can be configurable for mutual capacitance or self-capacitance sensing or a combination of mutual and self-capacitance sensing. For example, in one mode of operation, electrodes can be configured to sense mutual capacitance between electrodes, and in a different mode of operation the electrodes can be configured to sense self-capacitance of electrodes. In some examples, some of the electrodes can be configured to sense mutual capacitance therebetween and some of the electrodes can be configured to sense self-capacitance thereof.

In some examples, touch screen 102, touch surface 122, and/or trackpad 108 can be force sensitive surfaces. In some examples, the electrodes of touch screen 102, touch surface 122, and/or trackpad 108 are used for force sensing. In some examples, one or more force sensors can be implemented without using the electrodes of touch screen 102, touch surface 122, and/or trackpad 108. Various techniques may be utilized to detect and/or quantify the force, including but not limited to capacitive force sensing, resistive force sensing, piezoelectric force sensing, and/or strain gauge force sensing. For example, capacitive force sensing may sense changes in capacitance due to force-induced deformation or displacement of the touch and force-sensitive surface (and/or sensor structure); resistive technology may sense changes in resistance caused by compression of conductive materials; piezoelectric sensors may sense a voltage corresponding to mechanical stress; and strain gauges may sense force by detecting deformation of conductive traces.

FIG. 2 illustrates example computing system 226 including a touch and/or force sensing architecture or system having a touch and/or force controller and a touch and/or force sensor panel according to examples of the disclosure. In some examples, the touch and force operations can be implemented using different circuitry (e.g., a touch controller and/or touch processor for touch sensing operations and a force controller and/or force processor for force sensing operations). Computing system 226 can be included in, for example, a mobile phone, portable media player, portable or desktop computer, tablet, watch, wearable device, smart speaker, mouse, stylus, remote control, headphones, earbuds, or any mobile or non-mobile computing device that includes a touch screen or a touch and/or force sensor panel. Computing system 226 can include a touch and/or force sensing system including one or more touch and/or force processors 228, peripherals 230, touch and/or force controller 232, and touch and/or force sensing circuitry (described in more detail below). Peripherals 230 can include, but are not limited to, random access memory (RAM) or other types of memory or storage, watchdog timers and the like. Touch and/or force controller 232 can include, but is not limited to, column drivers 298 and column drive/sense circuits 234, channel scan logic 236, RAM 252, and row drive/sense circuits 238. Channel scan logic 236 can access RAM 252, autonomously read data from column drive/sense circuits 234 and row drive/sense circuits 238 (e.g., the channels) and provide control for the channels. In addition, channel scan logic 236 can control column drivers 298, column drive/sense circuits 234 and row drive/sense circuits 238 to generate stimulation signals at various frequencies and/or phases that can be selectively applied to the electrodes of touch and/or force sensor panel 244 using control signals 242, for example. In some examples, touch and/or force controller 232, touch and/or force processor 228 and peripherals 230 can be integrated into a single application specific integrated circuit (ASIC), and in some examples can be integrated with touch and/or force sensor panel 244 itself.

It should be apparent that the architecture or system shown in FIG. 2 is only one example architecture of computing system 226, and that the system could have more or fewer components than shown, or a different configuration of components. In some examples, computing system 226 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware, or any combination thereof, including one or more signal processing and/or application specific integrated circuits.

Computing system 226 can include a host processor 246 for receiving outputs from touch and/or force processor 228 and performing actions based on the outputs. For example, host processor 246 can be connected to program storage 248 and optional display controller/driver 250 (e.g., a liquid-crystal display (LCD) driver) when touch and/or force sensor panel 244 is combined with a display to form a touch screen. It is understood that although some examples of the disclosure that utilize displays may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Optional display controller/driver 250 can provide voltages on select (e.g., gate) lines to each electrode and can provide data signals along data lines to these same electrodes to control the electrode display image.

Host processor 246 can use optional display controller/driver 250 to generate a display image on an optional display combined with touch and/or force sensor panel 244 to form a touch and/or force screen, such as a display image of a user interface (UI), and can use touch and/or force processor 228 and touch and/or force controller 232 to detect a touch and/or force on or near touch and/or force sensor panel 244, such as a touch and/or force input to the displayed UI (or optionally a display UI on another device in communication with a stylus, or as an input independent of the displayed UI). The touch and/or force input can be used by computer programs stored in program storage 248 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 246 can also perform additional functions described herein that may or may not be related to touch and/or force processing.

Note that one or more of the functions described herein can be performed by firmware stored in memory (e.g., one of the peripherals 230 in FIG. 2) and executed by touch and/or force processor 228, or stored in program storage 248 and executed by host processor 246. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 252 or program storage 248 (or both) can be a non-transitory computer readable storage medium. One or both of RAM 252 and program storage 248 can have stored therein instructions, which when executed by touch and/or force processor 228 or host processor 246 or both, can cause the device including computing system 226 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

Touch and/or force sensor panel 244, which can include a touch and/or force sensing architecture for small form factor devices and curved touch sensor panels operable with a reduced number of I/O lines that minimizes the effects of negative pixels and reduced sense signal levels, can be used to derive touch and/or force information at multiple discrete locations on the touch and/or force panel, referred to herein as touch and/or force nodes or electrodes. Touch and/or force sensor panel 244 can include touch and/or force sensing circuitry that can include a capacitive sensing medium having a plurality of continuous row electrodes 254 (illustrated symbolically in FIG. 2 as lines) and a plurality of discrete column electrodes 256 (illustrated symbolically in FIG. 2 as rectangles). Touch and/or force nodes 258 can be defined at the location of one discrete column electrode 256 and the portion of the continuous row electrode 254 that surrounds that discrete column electrode. When configured for mutual capacitance sensing, column drivers 298 can transmit stimulation (drive) signals to one or more discrete column electrodes 256 in one or more columns 240 through column traces 264, and row drive/sense circuits 238 can sense voltages on one more continuous row electrodes 254 through row traces 266. When configured for self-capacitance sensing, row drive/sense circuits 238 can transmit self-capacitance stimulation signals onto continuous row electrodes 254 through row traces 266 and measure the voltage at the row electrodes using the same row drive/sense circuits through those same row lines, and column drive/sense circuits 234 can transmit self-capacitance stimulation signals onto discrete column electrodes 256 through column traces 264 and measure the voltage at the column electrodes using the same drive/sense circuits through those same column lines.

Through mutual capacitance touch sensing, self-capacitance touch sensing, and/or any of the force sensing techniques described herein, an indication of an amount of touch and/or force can be determined at each touch and/or force node 258, which can be thought of as touch and/or force picture elements. This way of understanding can be viewed as capturing an "image" of touch and/or force ("touch and/or force image"). In other words, after touch and/or force controller 232 has determined whether a touch and/or force has been detected at each touch and/or force node 258, the pattern of touch and/or force nodes at which a touch and/or force occurred can be thought of as an "image" of touch and/or force (e.g., a pattern of fingers contacting or in proximity to touch and/or force sensor panel 244). In some examples, a touch image and a force image can be generated using the same electrodes (e.g., touch and/or force nodes 258). In some examples, the touch image can be generated using an array of touch nodes and the force image can be generated using a different array of force nodes. As described herein, in some examples, force sensing at a plurality of force sensors (e.g., force nodes, etc.) can be combined to generate a representation of force that is not two-dimensional.

As used herein, an electrical component "coupled to" or "connected to" another electrical component encompasses a direct or indirect connection providing electrical path for communication or operation between the coupled components. Thus, for example, continuous row electrodes 254 may be directly connected to row drive/sense circuits 238 or indirectly connected to the row drive/sense circuits via row interface 260, and discrete column electrodes 256 may be directly connected to column drive/sense circuits 234 or indirectly connected to the column drive/sense circuits via column interface 262. In either case an electrical path for driving and/or sensing the electrodes can be provided.

In some examples, computing system 226 can also include one or more optical devices 294, which may also be referred to herein as optical components. In some examples, the one or more optical devices 294 can include components for light emitting and/or light sensing. In some examples, the one or more optical devices 294 can include light-emitting diodes (e.g., LEDs, OLEDs, etc.), cameras, lasers (e.g., vertical-cavity surface-emitting lasers, etc.), light detectors, photodiodes, and the like. In some examples, the operation of the optical devices can be controlled by host processor 246 or an optical controller (not shown) to perform functionality using the optical devices. The functionality can include, without limitation, projecting light, imaging, proximity sensing and ranging, ambient light sensing, photography, etc., among other possibilities. In some examples, the one or more optical devices 294 can be implemented in proximity to touch and/or force sensor panel 244 (e.g., on a periphery of or in a notch region along a perimeter of the touch and/or force panel).

In some examples, computing system 226 can also include one or more input and/or output devices, such as speaker 268 for generating audio output, microphones (not shown), or haptic circuitry for generating haptic output. It is understood that speaker 268 is an example input and/or output device, but other input and/or output devices are possible. In some examples, the one or more input and/or output devices include one or more sensors described herein. In some examples, the operation of the input and/or output devices, including speaker 268, can be controlled by host processor 246 or an input/output controller (not shown) to perform functionality using the input and/or output devices. The functionality can include audio functionality for speaker 268. In some examples, the one or more input and/or output devices can be implemented in proximity to touch and/or force sensor panel 244 (e.g., on a periphery of or in a notch region along a perimeter of the touch panel). As described in more detail herein, in some examples, the one or more input and/or output devices can be integrated with touch and/or force sensor panel 244.

Figure 3:
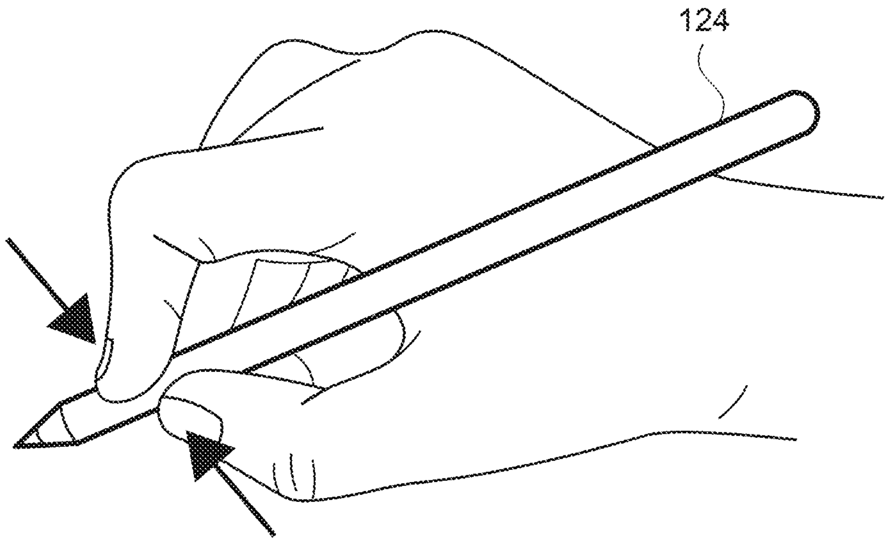
FIG. 3 illustrates an example electronic device that incorporates touch and/or force sensing technologies and an example force input according to some examples of the disclosure.

FIG. 3 illustrates an example electronic device that incorporates touch and/or force sensing technologies according to examples of the disclosure. As illustrated in FIG. 3, the example electronic device may be a stylus (e.g., corresponding to stylus 124), and force may be applied to a perimeter of the stylus by a plurality of objects (e.g., a user's fingers). While a stylus is depicted, it is understood that other devices equipped with force-sensing technologies can implement the force sensing techniques described herein. In some examples, one or more sensors are disposed along the perimeter of the stylus (e.g., circumferentially for a cylindrical stylus body or mostly cylindrical stylus body, such as a cylindrical stylus body with one or more flat surfaces) to measure the forces exerted by the fingers and/or hand of the user. In some examples, the measurement of force enables force input. For example, a user can squeeze the stylus (e.g., applying more force than a threshold force), representing a button press/click, and the user can release the squeezing of the stylus (e.g., applying less force than a threshold force), representing the button release/un-click. The one or more sensors collect data which can be used in determining whether the user is attempting to perform an intentional force input (e.g., rather than force associated with holding or gripping the stylus). For example, the one or more sensors in a multi-sensor array can capture individual force measurements that are combined into a combined force parameter. This combined force parameter may then be compared to one or more thresholds to determine a force input state (e.g., click or unclick state).

Although primarily described herein as using one threshold to transition to a click state and one threshold to transition to an un-click state, in some examples, different numbers of threshold and/or states can be supported. For example, a single threshold can be used to transition to a click state and to transition to an un-click state. In some examples, two or more thresholds can be used to differentiate between more than two states to support different types of force inputs. For example, the states can include a "light squeeze" or "pre-click" state in addition to the aforementioned click and unclick states. A relatively lighter squeeze can activate a first function, whereas a relatively firmer squeeze may activate a second, different function.

In some examples, upon recognizing a qualifying squeeze (e.g., a click event) and/or the end of a qualifying squeeze (e.g., an un-click event), the stylus provides feedback to the user. In the context of this disclosure, a click event and an un-click event can be understood as two states analogous to a button of a mouse that is clicked when force on a mouse button is above a threshold to activate the button and un-clicked when the force on the mouse button is below the threshold (or another threshold different to the threshold to activate the button) to deactivate the button. The click event can be held, similar long press of a mouse button, as long as the force applied by the user remains above the predetermined threshold or a different (e.g., lower) predetermined threshold. In some examples, the click event is recognized by the device when the combined force parameter, aggregated from force measurements at multiple electrodes, is greater than the predetermined threshold. In some examples, the un-click event is recognized by the device when the combined force parameter falls below the predetermined threshold or a different predetermined threshold. Some examples of the feedback include, but are not limited to, haptic feedback (e.g., a vibration or pulse within the stylus), auditory signals (e.g., a click sound or a beep), and/or visual cues using light emitters (e.g., light emitting diodes) of the stylus and/or using a display of the stylus or of a device in communication with the stylus. In some examples, customization options allow the user to tailor the sensitivity of the threshold(s) and the types of feedback received.

Figure 4:
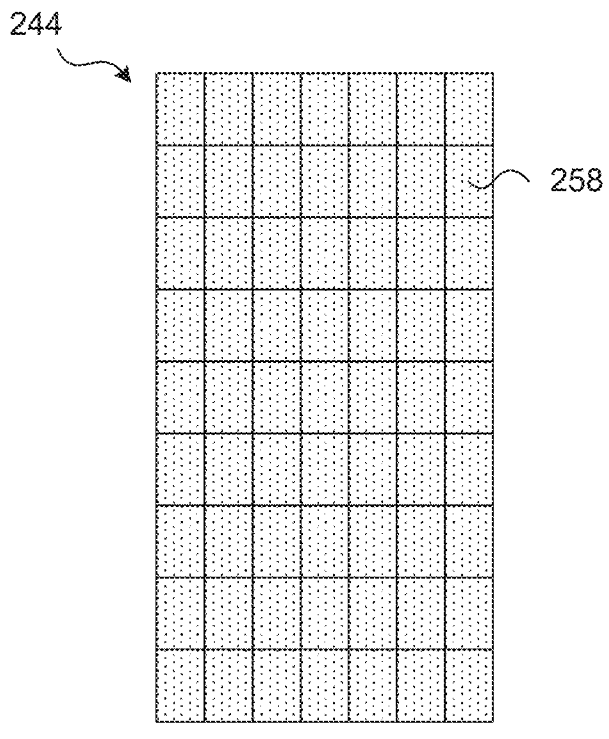
FIG. 4 illustrates an example array of electrodes of a touch and/or sensor panel according to some examples of the disclosure.

FIG. 4 illustrates an example array of electrodes for touch and/or force sensor panel 244 with touch and/or force nodes 258 symbolically represented as rectangles and arranged in a pixelated configuration. Although shown in a planar view, it is understood that the touch and/or force sensor panel 244 can be implemented in a non-planar manner. For example, the planar view of FIG. 4 can represent an unrolled view of a touch and/or force sensor panel 244 that is implemented as a cylinder corresponding to a cylindrical stylus body (or a mostly cylindrical stylus body). It is understood that, although not shown, force nodes 258 can be physically separated optionally by insulation so the adjacent nodes are physically and/or electrically isolated from one another. A touch and/or force node 258 can be used to sense a self-capacitance touch sensing measurement at the node and can be used to sense a force measurement at the node according to examples of the disclosure. Specifically, touch and/or force sensor panel 244 can include a plurality of individual touch and/or force nodes 258, each node identifying or representing a unique location on the sensor panel where touch or proximity (e.g., a touch or proximity event) or force (e.g., a squeeze) can be detected. In some examples, each touch and/or force node 258 is electrically isolated from the other nodes in touch and/or force sensor panel 244. In some examples, touch and/or force nodes 258 are positioned on the same or different material layers on touch and/or force sensor panel 244. In some examples, touch and/or force sensor panel 244 senses the self-capacitance of touch and/or force nodes 258 to detect touch and/or proximity activities. In some examples, touch and/or force sensor panel 244 employs one or more force sensing technologies such as resistive, piezoelectric, or dual-layer capacitive sensors to measure force applied to touch and/or force sensor panel 244. In some examples, each touch and/or force node 258 is separately driven and sensed. In some examples, the force data from each touch and/or force node 258 may be aggregated to form an aggregated force measurement of force applied to the electronic device, as described in greater detail herein. In some examples, touch sensing and force sensing operations are not performed using the same electrodes and touch and/or force sensor panel 244 represents a touch sensor panel or a force sensor panel. It is understood that a touch sensor panel and/or a force sensor panel can be implemented in different ways. For example, the touch (and/or force) sensor panel can be implemented using a row-column array of touch electrodes, and that touch can be sensed using other capacitive sensing techniques (e.g., mutual capacitance, etc.).

It should be understood that the 7×9 touch sensor panel in FIG. 4 is merely exemplary, and that the number of rows, the number of columns, and/or the number of nodes can vary according to various examples of the disclosure. For example, curved cylindrical touch surfaces such as those found on a stylus are likely to have longer columns oriented parallel to the axis of the stylus, and shorter rows oriented circumferentially around the stylus and perpendicular to the axis of the stylus. Accordingly, the number of rows (e.g., 9) may exceed the number of columns (e.g., 7) in a stylus-shaped device.

Figure 5:
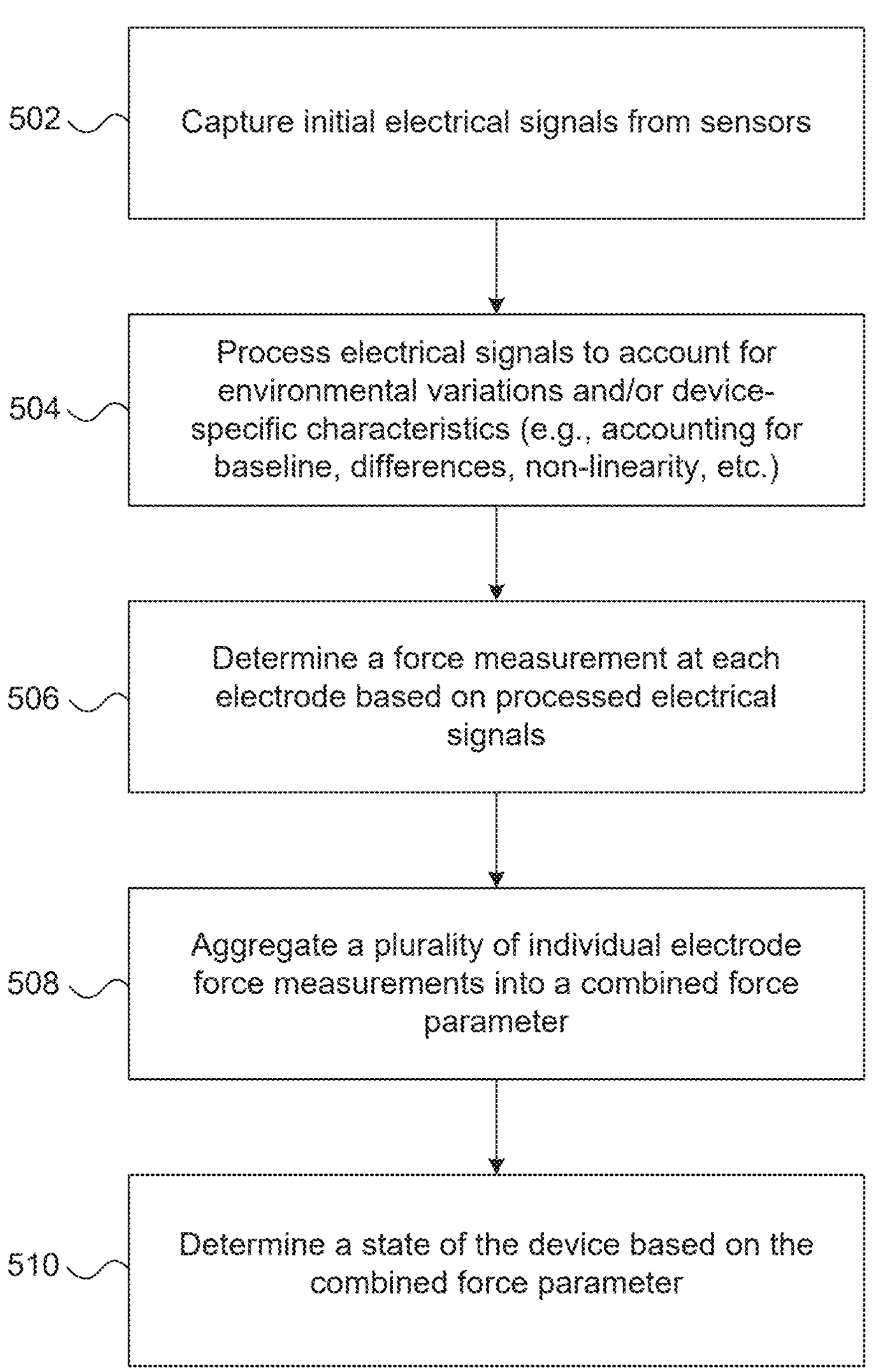
FIG. 5 illustrates an example flowchart diagram of a method for force input processing for a device with a plurality of force sensors according to some examples of the disclosure.

FIG. 5 illustrates an example flowchart diagram of a method 500 for force input processing for a device with a plurality of force sensors. Specifically, method 500 relates to detecting force from an array of force sensors to detect force inputs from squeezing an input device such as stylus 124. It is understood that while method 500 is described below with reference to components and configurations from FIGS. 1-4, various other components, configurations, and electronic devices may employ method 500 to achieve similar objectives.

In some examples, at operation 502, force sensing is performed by one or more sensors (e.g., touch and/or force sensor panels 244) of an electrical device (e.g., stylus 124). Force sensing can include capturing one or more parameters at a plurality of electrodes, including electrical signals. The electrical signals can be indicative of one or more physical or proximity interactions with the device (e.g., touch and/or hover inputs, force inputs). The one or more sensors may include, but are not limited to, capacitive sensors, resistive sensors, piezoelectric sensors, optical sensors, magnetic sensors, and/or any sensor which may be used to detect a touch and/or a force of a user on the electronic device. In some examples, when the electronic device is a stylus, the one or more sensors are disposed circumferentially along the perimeter of the stylus to capture electrical signals from different locations along the perimeter of the stylus. In some examples, the one or more sensors are arranged in one or more arrays (in regular patterns or scattered patterns) across the electronic device's surface or embedded within the internal components of the electronic device to enable the detection of touch and/or force from various contact points and directions. In some examples, electrical signals refer to the measurable electrical properties generated by the sensors, which change in response to touch and/or force interactions with the device. Some examples of electrical signals may include, but are not limited to, changes in voltage, current, resistance, or capacitance that occur when a user touches, presses, squeezes, comes close to, or otherwise interacts with one or more sensors of the device. In some examples, the electrical signals from the one or more sensors include data such as the magnitude, duration, and location of the user interaction with the device. For example, the magnitude of the signal can indicate a corresponding applied force for force sensing operations. In some examples, the electrical signals refer to the raw data captured by the one or more sensors before processing (e.g., before any modifications or adjustments are made to the signals). In some examples, the physical or proximity interactions with the device refer to various ways in which a user may engage with the device to trigger a response from the one or more sensors. In some examples, the physical interactions with the device involve direct contact with the device (e.g., touching, tapping, pressing, or squeezing) where the user physically manipulates the device's surface or components. In some examples, proximity interactions occur when a hand or finger of the user or another object comes close to the device without necessarily making direct contact, which may still influence the one or more sensors that detect the presence or motion near the device.

In some examples, at operation 504, the electrical signals captured by the one or more sensors are processed to account for environmental variations and/or device-specific characteristics. In some examples, environmental variations refer to any external factors that may influence the performance of the sensors and the accuracy of the electrical signals produced. Some examples of environmental variations include, but are not limited to, changes in temperature, humidity, pressure, electromagnetic interference from other devices, or any other environmental factors which may cause fluctuations in sensor outputs that are unrelated to user interactions. In some examples, device-specific characteristics refer to irregularities or variations within the electronic device itself that may affect the accuracy and consistency of the sensor outputs. Some examples of device-specific characteristics include, but are not limited to, variations in sensor calibration, inconsistencies in sensor wear and tear, or any variations that are internal to the device and may lead to erroneous readings of the electrical signals that do not accurately reflect the interactions of the user. In some examples, processing the electrical signals involves one or more operations performed on the raw data collected by the one or more sensors to enhance the quality and reliability of the data before it is used to make further determinations about user interactions. Some examples of operations that may be performed on the electrical signals include, but are not limited to, filtering (e.g., to remove noise and other unwanted signals), amplification (e.g., to increase the strength of the electrical signals, making them more discernible and easier to analyze), normalization (e.g., adjusting the signal levels from all sensors to a common scale or range), calibration (e.g., adjusting the signals to align with known standards or expected values), compensation (e.g., correcting any distortions or biases in the signals based on known environmental variations or device-specific characteristics), data conversion (e.g., transforming analog signals into digital form), feature extraction (e.g., identifying and isolating specific characteristics of the signals relevant to understanding the user interaction, such as the magnitude of the force, duration of contact, or specific patterns), or any other operations which may be taken to ensure the processed signals accurately represent the user's interactions with the device.

In some examples, at operation 506, the system (e.g., computing system 226) determines the force (or a parameter correlated with the force) exerted on each electrode (e.g., touch and/or force nodes 258) based on the processed electrical signals. In some examples, determining the force exerted on each electrode based on the processed electrical signals refers to quantifying how much physical force or pressure is being applied at each sensor using the modified (e.g., at operation 504) electrical signals from each sensor to. In some examples, determining the force exerted at each electrode includes one or more of: signal interpretation (e.g., interpreting the amplitude, duration, and/or pattern of the processed signals), quantification of force (e.g., using algorithms to convert the characteristics of the electrical signals into measurable units of force), spatial analysis (e.g., assessing where on the device the force is applied), temporal analysis (e.g., analyzing how the force changes over time). In some examples, quantifying the force exerted on each electrode involves one or more methods, including, but not limited to: amplitude measurement (e.g., analyzing the amplitude of the processed signals where relatively higher amplitudes are indicative of relatively greater forces applied), area under the curve (e.g., calculating the integral of the signal over time), temporal dynamics (e.g., analyzing the rate of change of the signal), and/or any other method for providing a value associated with the force exerted on each electrode.

In some examples, at operation 508, the system (e.g., computing system 226) aggregates individual electrode force measurement from multiple force sensors into a combined force parameter. For example, the combined force parameter can aggregate the quantified forces (or a force-correlated parameter) from all active electrodes (e.g., touch and/or force nodes 258) to create a single value that represents a total force exerted on the device (e.g., stylus 124) at a given moment. For example, if stylus 124 includes touch and/or force sensor panel 244 with multiple touch and/or force nodes 258 each sensing force (or a force-correlated parameter), the combined force parameter would represent the overall applied force by incorporating the data from all these points, as described in greater detail with respect to FIG. 6. In some examples, combining each individual electrode force measurement into the combined force parameter can be achieved using algorithms (e.g., data combination module 600 of FIG. 6) or using a neural network or other machine learning model or artificial intelligence to generate a signal parameter reflecting the applied force on the device, as described in greater detail with respect to FIG. 6.

In some examples, at operation 510, the system (e.g., computing system 226) utilizes a force state machine (e.g., force state machine 700 of FIG. 7), to determine a state of the device based on the combined force parameter. In some examples, the force state machine is implemented using software, firmware, hardware, or a combination thereof. In some examples, the force state machine is implemented using discrete logic circuits. In some examples, the force state machine is implemented using a processor or processing circuitry or microcontroller circuit executing software. In some examples, the force state machine can be implemented using a programmable logic device (PLD) or a field programmable gate array (FPGA). The force state machine implements logical rules for using the combined force parameter to determine the state of the device (and to transition states), as described in greater detail with respect to FIG. 7. In some examples, the state of the device refers to the operational condition or mode that the device is currently exhibiting based on the user's interactions, as detected through sensor inputs. For example, when the device is stylus 124, the states of the device may include a "click" state when a qualifying squeeze is detected and an "unclick" state when no qualifying squeeze is detected.

In some examples, the operations of method 500 may be implemented with one or more variations, including adding one or more operation, omitting one or more operations, combining one or more operation, or changing the order of operations. For example, operation 504 and operation 506, which involve processing electrical signals and determining force exerted on each electrode, respectively, may be combined into one operation. As another example, operation 506 may be modified or skipped altogether according to specific application needs or device capabilities. In some examples, rather than individually measuring force at each electrode and combining the force measurements, the system may combine the measured values (e.g., capacitance values, or the like) from all electrodes and then convert the combined capacitance value into a force measurement. In some examples, the system determines a user interaction by comparing a combined capacitance value against a capacitance threshold, bypassing the need for force quantification at each electrode or after determining the combined capacitance value. In some examples, different operations are performed by different components of the system. For example, operation 504 is optionally implemented with a dedicated signal conditioning chip that automatically adjusts for environmental variations before the signals reach another processor.

Figure 6:
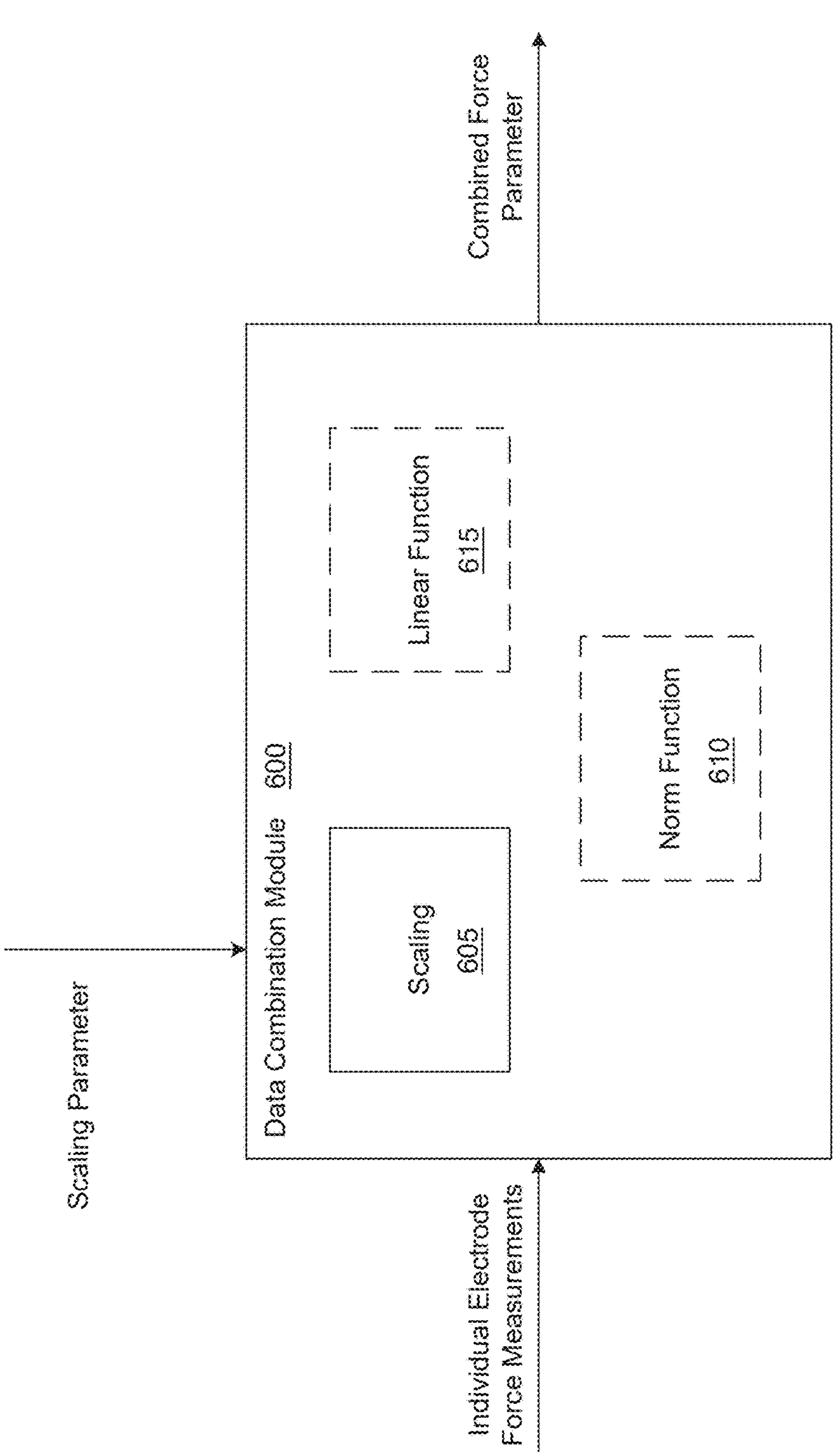
FIG. 6 illustrates a data combination module of an electronic device according to some examples of the disclosure.

FIG. 6 illustrates a data combination module 600 of an electronic device according to examples of the disclosure. The data combination module 600 can implement operation 508 of method 500. The data combination module can be implemented in hardware, software, firmware, or any combination thereof. In some examples, data combination module 600 receives a plurality of electrode force measurements (e.g., from the individual force nodes) and one or more scaling parameters as inputs. These inputs are processed by the data combination module 600, which includes computational blocks for scaling, optionally applying one or more linear functions, and/or optionally applying one or more norm functions, to output a combined force parameter, which represents an aggregated measure of the force exerted at the force sensitive surface of the electronic device.

In some examples, the individual electrode force measurements input refers to the quantified force data collected from the one or more force sensors (e.g., at touch and/or force nodes 258 of the touch and/or force sensor panel 244 using touch and/or force controller 232), as described in greater detail with respect to FIG. 5 (e.g., from operations 502-506). In some examples, the one or more scaling parameters are stored in memory (e.g., program storage 248 or other memory) or are obtained from predefined settings within the device's software or firmware. The one or more scaling parameters can be determined empirically or using simulations, among other possibilities, designed to adjust the sensitivity or responsiveness of the force measurements according to specific application needs or user preferences. The one or more scaling parameters may also be dynamically adjusted based on the operational context of the device, such as changes in the environmental conditions or the specific task being performed. In some examples, the scaling parameter is derived from calibration processes that ensure the force measurements from the electrodes are accurate and consistent across the device.

In some examples, the combined force parameter output from data combination module 600 is a metric used to make decisions about user interactions. For example, referring back to FIG. 5, the output of data combination module 600 can be used to determine the state of the device as described herein with reference to operation 508 and force state machine 700. The combined force parameter, and the force state machine using the combined force parameter, can be used to detect force inputs such as click and un-click actions that correspond to a force input. For example, the click and un-click actions can be used to implement functionality of a button that may be pressed and released (within a threshold period of time) or pressed and held (for longer than the threshold period of time), which may also have an analog to press and long-press inputs for touch screen. These inputs may be directed to various subsystems for further action. In some examples, the combined force parameter is used to trigger specific functions or commands within a user interface. For example, when the combined force parameter exceeds a certain threshold, the system may initiate actions such as selection or toggling a characteristic of stylus input (e.g., line thickness, color, tool tip, etc.) within software applications. In some examples, the combined force parameter is utilized to provide immediate feedback to the user (e.g., haptic feedback, visual animations, or auditory signals) to help the user understand the state of the force state machine and whether force input is operative. In some examples, when the device has multiple operational modes, the combined force parameter is used to switch between these modes. In some examples, the combined force parameter is used as a method of authentication or for executing a secure command. For example, one or more combined force parameters may be used to validate a force pattern associated with authorized users.

Aggregating individual force measurements into the combined force parameter may be achieved using various techniques. Some examples of these techniques include, but are not limited to, summation (e.g., summing the individual force measurements from each electrode), weighted average (e.g., assigning different weights to the force measurements from each electrode, such as based on their location or sensitivity), root mean square (e.g., giving greater weight to higher values), geometric mean (e.g., an aggregation that is less sensitive to outlier values), max/min pooling (e.g., for cases where only the maximum or minimum force measurement is relevant), quadratic or higher-order (e.g., squaring the individual measurements before averaging, then taking the square root of the result), and custom algorithmic approaches (e.g., certain algorithms developed depending on specific device needs, user requirements, interaction context or historical data patterns). In some examples, the techniques used for aggregation ensure a combined force parameter is equal to zero or is a positive value (e.g., no negative combined force parameter).

In some examples, aggregation described herein includes scaling the plurality of force measurements with one or more scaling parameters represented by scaling block 605. In some examples, scaling involves adjusting the magnitude of the force measurements from each electrode to normalize or to emphasize certain measurements over others, depending on the design and/or functional needs of the device. Some examples of scaling include, but are not limited to, constant scaling (e.g., multiplying each force measurement by a constant scaling value) or not constant scaling, including weighted scaling (e.g., assigning different weights to each measurement before they are combined) and non-linear scaling (e.g., scaling each individual force measurement depending on the measurement itself, such as amplifying smaller measurements more than larger measurements). In some examples, the plurality of force measurements is represented as a vector (e.g., each entry representing one force measurement from one node), and the one or more scaling parameters are represented as a constant or a vector (e.g., each entry representing one of the plurality of scaling values to be applied to the corresponding force measurement). In some examples, the one or more scaling parameters are represented by a diagonal matrix scaling (e.g., scaling each force measurement by the same or a different factor via a diagonal matrix, where each diagonal element corresponds to a scaling factor for a corresponding force measurement). In some examples, adaptive scaling that dynamically adjusts scaling factors based on real-time data or environmental conditions can be used. In some examples, the plurality of force measurements is represented as matrix (e.g., the 7×9 array of nodes is represented using a 7×9 matrix of force measurements), rather than as a vector.

In some examples, optional norm function block 610 refers to a mathematical norm function used by data combination module 600 to aggregate scaled force measurements into a single combined force parameter. Properties of the norm function include absolute homogeneity, positive definiteness, and triangle inequality. Within the context of this disclosure, absolute homogeneity refers to a property that for any scalar value α and any vector v in a vector space, the norm of the scaled vector αv is equal to the absolute value of a times the norm of v, represented by: $\|\alpha v\|=|\alpha|\cdot\|v\|$. Within the context of this disclosure, positive definiteness refers to a property that that norm of any vector v is always non-negative and is zero only if the vector itself is the zero vector, represented by $\|v\|\geq 0$ and $\|v\|=0 \Leftrightarrow v=0$. Within the context of this disclosure, triangle inequality refers to a property that for any two vectors u and v in a vector space, the norm of their sum is less than or equal to the sum or their norms, represented by $\|u+v\|\leq\|u\|+\|v\|$. Some examples of norm functions include, but are not limited to, absolute-value norms (e.g., calculating the absolute value of each element and summing the values), Taxicab or Manhattan norms (l1 norms) (e.g., summing the absolute values of the columns), Euclidean norms (l2 norms) (e.g., calculating the square root of the sum of the squares of the elements), infinity norms (max norms) (e.g., the set of vectors whose infinity norm is a given constant, c, forms the surface of a hypercube with edge length 2c), finite-dimensional complex normed spaces (e.g., taking the square root of the inner product of the vector and itself), composite norms (e.g., combining two or more different norms to form a new norm based on specific criteria or weights), weighted norms (e.g., applying a weight to each element before applying another norm function), and p-norms (e.g., calculating the $p^{th}$ root of the sum of each element raised to the power of p). It is understood that the above list includes other less common norms such as l1.5, l3, l4, l5, l6, l7, l12, etc., or semi-norms (e.g., discarding negative force measurements) among other possible options. In some examples, the norm function accepts p=0, 1, 2, or any real p≥1. In some examples, the combination of scaling at 605 and the norm function at block 610 can be represented mathematically as $\hat{f}=\|Kg\|_x$, where $\hat{f}$ represents the combined force parameter, K represents a diagonal scaling matrix, g represents a vector of force measurements, and x represents the norm type.

In some examples, optional linear function block 615 refers to a mathematical linear function used by data combination module 600 to aggregate scaled force measurements into a single combined force parameter. Properties of the linear function include homogeneity and additivity properties. Within the context of this disclosure, homogeneity refers to a property that scaling the input by a factor, results in scaling the output by the same factor, represented by $f(\alpha v)=\alpha f(v)$. Within the context of this disclosure, additivity refers to a property that the sum of the function applied to two vectors is equal to the function applied to the sum of those vectors, represented by $f(u+v)=f(u)+f(v)$. Some examples of linear functions include, but are not limited to, addition and subtraction (e.g., simple linear functions involving adding or subtracting a constant value from each scaled measurement), scalar multiplication (e.g., multiplying each element of the scaled force data by a constant scalar), matrix multiplication (e.g., multiplying each force vector by a transformation matrix), linear combination (e.g., multiplying each measurement by a respective coefficient and summing the results), identity functions (e.g., leaving the data unchanged), piecewise linear functions (e.g., applying different linear relationships to different segments of the data range).

Figure 7:
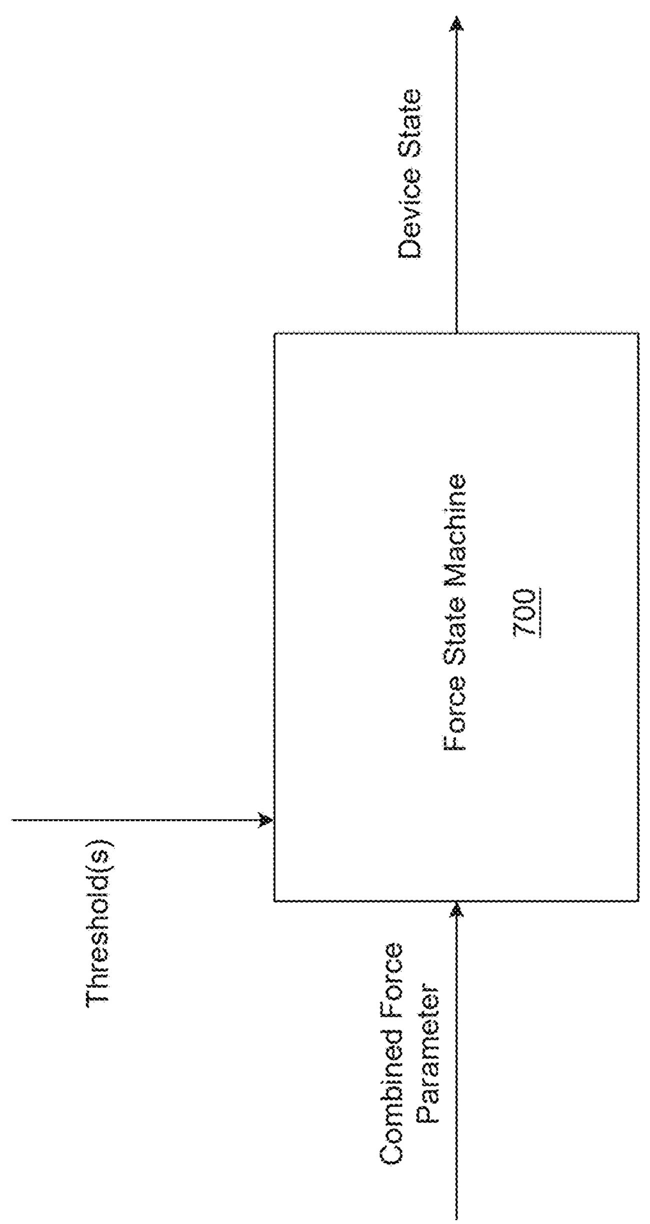
FIG. 7 illustrates an example force state machine according to some examples of the disclosure.
Figure 8:
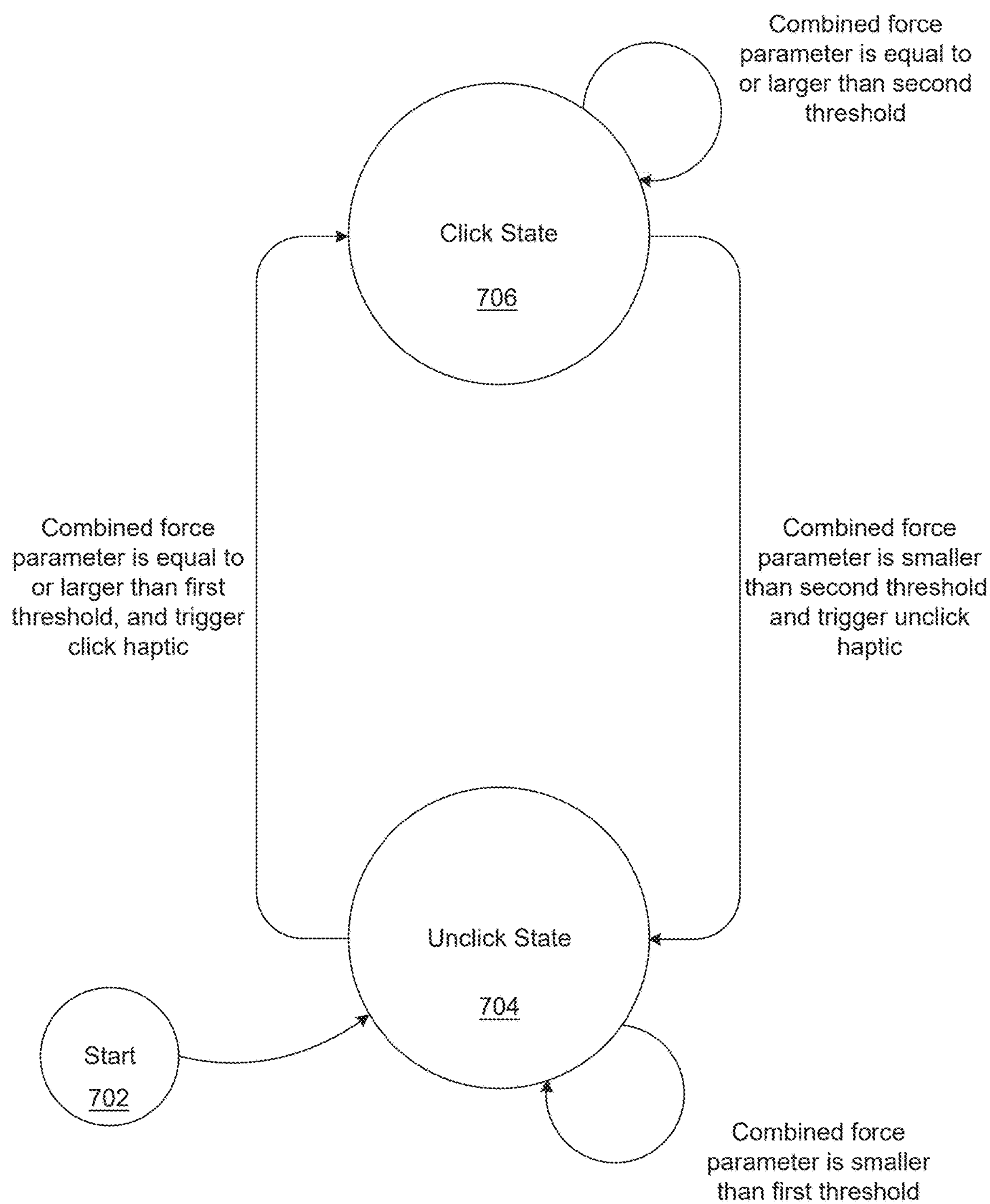
FIG. 8 illustrates an example state diagram for an electronic device according to some examples of the disclosure.

As described herein, a force state machine can use the combined force parameter to transition states and determine whether a force input has occurred. For example, FIGS. 7-8 illustrate an example force state machine according to examples of the disclosure. In some examples, as shown in FIG. 7, force state machine 700 accepts the combined force parameter and one or more thresholds as inputs and outputs the state. As shown in FIG. 8, the states of force state machine 700 include an optional start/reset state 702, an unclick state 704, and a click state 706. In some examples, the system can include unclick state 704 and click state 706 without start/reset state 702 (e.g., start/reset returns to unclick state 704).

In some examples, the combined force parameter is an input for force state machine 700, which is derived from one or more operations described in FIGS. 5 and 6 (e.g., by aggregating individual force measurements from multiple electrodes). In some examples, the one or more thresholds are stored in memory (e.g., program storage 248 or other memory) or are obtained from predefined values set within the device's software or firmware, which serve as critical points for determining transitions between different states of the electronic device. The one or more thresholds can be determined empirically or using simulations, among other possibilities. In some examples, the one or more thresholds are established based on the specific requirements of the electronic device's operation and user needs. In some examples, the one or more thresholds are originally set based on typical user interaction patterns and then are dynamically adjusted based on the device's operational context, user preferences, or environmental factors, as described in greater detail with respect to FIG. 9. In some examples, the one or more thresholds enable force state machine 700 to use the combined force parameter to facilitate transitions between device states such as unclick state 704 and click state 706.

In some examples, the device state output from force state machine 700 is an indicator that defines the operational mode or condition of the device based on the processed force interactions. The device state may reflect how the device interprets the combined force parameter in relation to the one or more thresholds (e.g., as a force input such as a button press or long press, or not a force input). In some examples, the device state output is communicated to one or more components of the device, as described with respect to FIG. 5. For example, the device state may be communicated to host processor 246 or touch and/or force processors 228 to perform one or more functions, such as providing user feedback (e.g., providing haptic, auditory, or visual feedback to the user), executing commands (e.g., triggering specific commands or actions associated to unclick state 704 or click state 706), changing device operations (e.g., influencing power management or security protocols), etc.

In some examples, start/reset state 702 serves as the initial condition or entry point for force state machine 700 when the device is powered on or reset, or stylus force sensing is enabled. Start/reset state 702 may serve to establish a baseline or default operational mode before any user interaction is detected, ensuring the device begins operation in a known, stable state.

In some examples, upon activation (power up, or initiating force sensing operations) or after reset, the device transitions from start/reset state 702 to unclick state 704. This transition may serve to prepare the device for user interactions by setting it to a ready/waiting mode, indicating to, for example, touch and/or force processors 228 that the device is ready to detect and respond to the user's force inputs. In some examples, the device returns to start/reset state 702 when a reset input is received or when the device powers down. In such scenarios, the device may reinitialize its settings and sensors, ensuring that any subsequent operations begin from a consistent and controlled baseline.

In some examples, unclick state 704 represents a baseline or idle condition of the device where no significant for interaction is detected, e.g., less than a threshold amount of force is detected. Within unclick state 704, two transitions are defined based on a first threshold: when the combined force parameter is less than the first threshold and when the combined force parameter is equal to or larger than the first threshold. In some examples, the first threshold is a value set to distinguish between negligible or accidental force (e.g., handling force) and intentional force indicative of active user interaction. In some examples, while the device is in unclick state 704, when the combined force parameter is less than the first threshold, the device remains in unclick state 704. This may indicate that the squeeze force exerted on the device is absent and/or below the required force to trigger a state change. In some examples, while the device is in unclick state 704, when the combined force parameter is equal to or greater than the first threshold, the device transitions from unclick state 704 to click state 706. A combined force parameter equal to or greater than the first threshold indicates that the force exerted on the device is likely intentional and strong enough to be considered a user interaction with the device. In some examples, when the device transitions from unclick state 704 to click state 706, this triggers a click feedback to the user (e.g., haptic, auditory, and/or visual feedback).

In some examples, click state 706 represents an activation condition of the device where a significant force interaction, e.g., a threshold amount of force or greater than a threshold amount of force is detected, indicative of deliberate user input. Click state 706 may facilitate interactions such as selections, activations, or similar user commands. Within click state 706, two transitions may be defined based on a second threshold: when the combined force parameter is equal to or greater than the second threshold and when the combined force parameter is less than the second threshold. The second threshold can be set to be equal to the first threshold in some examples. Alternatively, the second threshold can be set to be lower than the first threshold. In some examples, the second threshold is set to be a percentage of the first threshold (e.g., 95%, 90%, 85%, 80%, 70%, 60%, etc.)

In some examples, while the device is in click state 706, when the combined force parameter is equal to or greater than the second threshold, the device remains in click state 706. Maintaining the combined force parameter equal to or greater than the threshold indicates the user is maintaining the force input and continuing the user interaction. In some examples, while the device is in click state 706, when the combined force parameter is less than the second threshold, the device transitions from click state 706 to unclick state 704. The combined force parameter is less than the second threshold indicates that the force exerted on the device has been reduced sufficiently to be considered as releasing or ending the user interaction. In some examples, when the device transitions from click state 706 to unclick state 704, this triggers an unclick feedback to the user (e.g., haptic, auditory, and/or visual feedback).

In some examples, hysteresis is implemented within force state machine 700 to prevent rapid, unwanted toggling between click and unclick states due to minor or transient fluctuations in the combined force parameter near the threshold. In some examples, hysteresis is implemented using different first and second thresholds for toggling into the click state and toggling out of the click state, respectively. In some examples, hysteresis can be introduced by adding in a timing criterion for transitioning state. In particular, the force state machine 700 can be implemented such that the transition criterion (e.g., combined force parameter greater than or equal to the first threshold) has to be satisfied consistently over multiple force sensing operations or a threshold number of time within a specified duration before a state change is executed. In some examples, before transitioning from unclick state 704 to click state 706, the system requires that the combined force parameter exceeds the first threshold continuously for a first predefined period or a first number of measurements within a first period of time (or consecutive measurements). In some examples, before transitioning from click state 706 to unclick state 704, the system requires that the combined force parameter fall below the second threshold continuously for a second predefined period or a second number of measurements within a second period of time (or consecutive measurements). In some examples, the second predefined period is the same as the first predefined period or the second number of measurements within the second period of time is the same as the first number of measurements within the first time period. In some examples, the second predefined period is different from the first predefined period or the second number of measurements within the second period of time is different from the first number of measurements within the first time period.

Although force state machine 700 shows a click or unclick state, it is understood that additional states could be used in some examples. In some examples, one or more additional thresholds are set to distinguish between these additional states. For examples, the states can include two different click states, such as a first click state (e.g., a "light squeeze") and a second click state (e.g., "firm squeeze"), where transitions from the unclick state to the first click or second click state depend on the amount of applied force, differentiated using different thresholds. One or more thresholds can be used to provide transitions from the first or second click states to the unclick states.

In some examples, the one or more thresholds of force state machine 700 described herein can be predetermined thresholds. In some examples, the one or more thresholds of force state machine 700 can be dynamic thresholds that change based on operating conditions. For example, in certain operating conditions an increase in applied force may be detected when the user is not intending to provide a force input. Thus, to avoid false positive force inputs, the system can use one or more dynamically increased threshold for the force state machine. The operating conditions can be detected based on information from one or more sensors of the electronic device (e.g., stylus 124) and/or one or more sensors of another electronic device in communication with the electronic device (e.g., tablet computing device 110).

Some examples of operating conditions include, but are not limited to, writing or drawing, lifting up the device, riding in a vehicle with acceleration (e.g., due to bumps or rapid starts/stops), and a user fidgeting. For each of these conditions, a user may apply more force for gripping the input device, which can trigger false positive force inputs (e.g., unintended transitions to the click state and/or unclick state). Increasing one or more of the thresholds dynamically can avoid triggering these unintended transitions.

Figure 9:
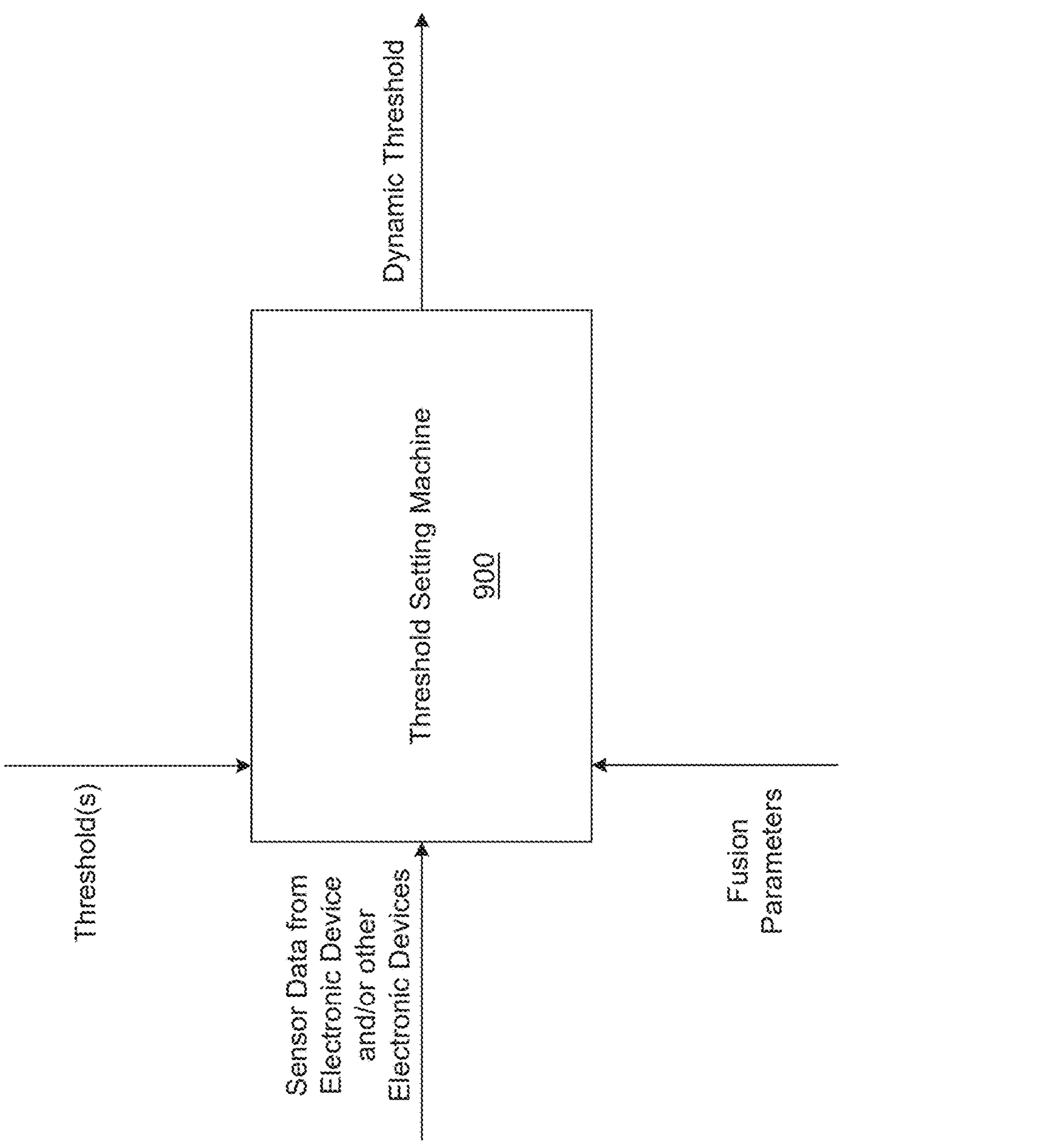
FIG. 9 illustrates an example threshold setting module according to some examples of the disclosure.

FIG. 9 illustrates an example threshold setting module 900 according to examples of the disclosure. In some examples, the threshold setting module is implemented using software, firmware, hardware, or a combination thereof. In some examples, threshold setting module 900 accepts one or more thresholds, sensor data from the electronic device itself and/or from other devices in communication with the electronic device, and/or fusion parameters as inputs. Threshold setting module 900 outputs one or more dynamic thresholds (e.g., provided to the force state machine 700).

In some examples, the one or more input thresholds refer to the baseline or initial thresholds that are predetermined for the electronic device. The one or more thresholds may be set during the calibration of the device, based on empirical data, expected usage scenarios, and/or historical user data, as described in greater detail herein. In some examples, the one or more thresholds are stored in memory (e.g., program storage 248 or other memory) or are obtained from predefined values set within the device's software or firmware.

In some examples, the sensor data from the electronic device and/or other devices in communication with the electronic device refers to data collected from a variety of sensors embedded within the electronic device, as well as optionally from sensors located in other devices that are connected to the electronic device via network or direct communication links. In some examples, the sensor data is obtained from sensors of the electronic device, such as a stylus. For example, the stylus can include one or more touch sensors, one or more force sensors, one or more accelerometers, one or more gyroscopes, one or more stylus tip force sensors (to measure force applied at a stylus tip), one or more proximity sensors, one or more temperature sensors, or one or more ambient light sensors within the electronic device, among other possibilities. In some examples, the sensor data is obtained from sensors external to the electronic device. For example, sensors in connected devices such as smartphones, wearables such as fitness bands or smartwatches, tablets, or internet of things (IoT) devices, such as one or more touch sensors, one or more force sensors, one or more accelerometers, one or more gyroscopes, one or more global position sensors, one or more temperature sensors, or one or more ambient light sensors within the electronic device, among other possibilities. In some examples, the input fusion parameters enable threshold setting module 900 to combine data from one or more sensors and use the data to understand the operating conditions. The fusion parameters may be predefined rules or algorithms that guide the fusion of sensor data, ensuring the integration of diverse data sources is executed accurately. In some examples, the fusion parameters are stored in memory (e.g., program storage 248 or other memory) or are obtained from predefined values set within the device's software or firmware.

In some examples, dynamic thresholds are adjustable criteria that the device uses to determine the sensitivity and responsiveness of its interaction mechanisms based on the current operational environment and user behavior. Unlike static thresholds, which remain fixed regardless of context, dynamic thresholds are continually recalibrated based on real-time data inputs, such as sensor readings and environmental conditions. The dynamic thresholds may ensure the electronic device is tuned to the conditions under which it is being used, decreasing the chance for false positives and/or negatives. In some examples, the output of threshold setting module 900 is directed towards force state machine 700 and/or other systems within the device that require sensitivity adjustments as described herein. For example, the dynamic thresholds may be used by force state machine 700 to determine accurate state transitions that account for conditions affecting the user and/or the device. Other examples of systems that may require sensitivity adjustments include, but are not limited to, feedback systems (e.g., to ensure feedback is relevant and timely according to the user's interactions), event triggers (e.g., to initiate certain functions or actions such as security features or power-saving modes), and data logging and analysis systems (e.g., to provide insight into user behavior and/or device performance). In some examples, the dynamic thresholds are communicated to host processor 246 and/or to touch and/or force processors 228 to perform one or more functions adjusted to the conditions affecting the device and/or the user.

Therefore, according to the above, some examples of the disclosure are directed to an electronic device. The electronic device includes a plurality of electrodes, sensing circuitry, and processing circuitry. The sensing circuitry is coupled to the plurality of electrodes and is configured to sense one or more parameters at the plurality of electrodes. The processing circuitry is coupled to the sensing circuitry. The processing circuitry is programmed to combine the one or more parameters sensed at the plurality of electrodes into a combined parameter corresponding to an applied force to a surface of the electronic device. The processing circuitry is programmed to detect a click event in accordance with a determination that one or more first criteria are satisfied, the one or more first criteria including a criterion that is satisfied when the combined parameter is at or greater than a first threshold.

Additionally or alternatively to one or more of the examples disclosed above, in some examples, the combined parameter corresponding to the applied force represents a squeezing force applied by a plurality of objects to a perimeter of the surface.

Additionally or alternatively to one or more of the examples disclosed above, in some examples, the surface is a cylindrical surface and the plurality of electrodes is arranged to measure the applied force to the cylindrical surface.

Additionally or alternatively to one or more of the examples disclosed above, in some examples, combining the one or more parameters into the combined parameter includes scaling the one or more parameters.

Additionally or alternatively to one or more of the examples disclosed above, in some examples, scaling the one or more parameters includes scaling by a constant scaling value for each of the one or more parameters.

Additionally or alternatively to one or more of the examples disclosed above, in some examples, scaling the one or more parameters includes scaling a plurality of the one or more parameters by a plurality of constant scaling values including scaling a first parameter of the plurality of the one or more parameters by a first constant scaling value and a second parameter of the plurality of the one or more parameters by a second constant scaling value different from the first constant scaling value.

Additionally or alternatively to one or more of the examples disclosed above, in some examples, the plurality of electrodes is a two-dimensional array of electrodes and the one or more parameters are represented using a one-dimensional vector.

Additionally or alternatively to one or more of the examples disclosed above, in some examples, combining the one or more parameters into the combined parameter includes a product of a scaling matrix and the one-dimensional vector.

Additionally or alternatively to one or more of the examples disclosed above, in some examples, the scaling matrix is a diagonal matrix with one or more scaling values.

Additionally or alternatively to one or more of the examples disclosed above, in some examples, combining the one or more parameters into the combined parameter includes applying a linear function to the one-dimensional vector.

Additionally or alternatively to one or more of the examples disclosed above, in some examples, combining the one or more parameters into the combined parameter includes computing a norm of the one-dimensional vector.

Additionally or alternatively to one or more of the examples disclosed above, in some examples, computing the norm of the one-dimensional vector includes an absolute norm, a Euclidean norm, a semi-norm, a maximum norm, an Lp norm, or a weighted norm.

Additionally or alternatively to one or more of the examples disclosed above, in some examples, the combined parameter is zero or positive.

Additionally or alternatively to one or more of the examples disclosed above, in some examples, the electronic device includes one or more sensors different from the plurality of electrodes, and the processing circuitry is programmed to adjust the first threshold based on data from the one or more sensors.

Additionally or alternatively to one or more of the examples disclosed above, in some examples, adjusting the first threshold based on the data from the one or more sensors includes fusion of data from a plurality of sensors.

Additionally or alternatively to one or more of the examples disclosed above, in some examples, the one or more sensors includes an accelerometer, a gyroscope, a force sensor different from the plurality of electrodes, a touch sensor, and/or a proximity sensor.

Additionally or alternatively to one or more of the examples disclosed above, in some examples, the processing circuitry is programmed to adjust the first threshold based on information from a second electronic device in communication with the electronic device.

Additionally or alternatively to one or more of the examples disclosed above, in some examples, the processing circuitry is programmed to detect an unclick event in accordance with a determination that one or more second criteria are satisfied, the one or more second criteria including a criterion that is satisfied when the combined parameter is less than a second threshold.

Additionally or alternatively to one or more of the examples disclosed above, in some examples, the second threshold is based on the first threshold.

Additionally or alternatively to one or more of the examples disclosed above, in some examples, the second threshold is less than the first threshold by a predetermined percentage.

Additionally or alternatively to one or more of the examples disclosed above, in some examples, the electronic device includes one or more sensors different from the plurality of electrodes, and the processing circuitry is programmed to adjust the second threshold based on data from the one or more sensors.

Additionally or alternatively to one or more of the examples disclosed above, in some examples, the processing circuitry is programmed to detect a state of the electronic device, maintain the first threshold at a predetermined threshold in accordance with detecting the state of the electronic device is a first state, and adjust the first threshold to a different threshold greater than the predetermined threshold in accordance with detecting the state is a second state, different from the first state.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:

a plurality of electrodes;

sensing circuitry coupled to the plurality of electrodes and configured to sense one or more parameters at the plurality of electrodes; and processing circuitry coupled to the sensing circuitry, the processing circuitry programmed to:

process the one or more parameters sensed at the plurality of electrodes to account for one or more environmental variations or device-specific characteristics to generate one or more processed parameters;

determine a force exerted on one or more electrodes of the plurality of electrodes based on the one or more processed parameters;

combine the force exerted on the one or more electrodes of the plurality of electrodes into a combined parameter corresponding to an applied force to a surface of the electronic device; and in accordance with a determination that one or more first criteria are satisfied, the one or more first criteria including a criterion that is satisfied when the combined parameter is at or greater than a first threshold, detect a click event.

2. The electronic device of claim 1, wherein the combined parameter corresponding to the applied force represents a squeezing force applied by a plurality of objects to a perimeter of the surface.

3. The electronic device of claim 1, wherein combining the force exerted on the one or more electrodes of the plurality of electrodes into the combined parameter comprises scaling one or more force measurements corresponding to the force exerted on the one or more electrodes of the plurality of electrodes.

4. The electronic device of claim 3, wherein scaling the one or more force measurements comprises scaling by a constant scaling value for each of the one or more parameters force measurements.

5. The electronic device of claim 3, wherein scaling the one or more force measurements comprises scaling a plurality of the one or more force measurements by a plurality of constant scaling values including scaling a first force measurement of the plurality of the one or more force measurements by a first constant scaling value and a second force measurement of the plurality of the one or more force measurements by a second constant scaling value different from the first constant scaling value.

6. The electronic device of claim 3, wherein the plurality of electrodes is a two-dimensional array of electrodes and the one or more force measurements are represented using a one-dimensional vector.

7. The electronic device of claim 6, wherein scaling the one or more force measurements comprises a product of a scaling matrix and the one-dimensional vector.

8. The electronic device of claim 7, wherein the scaling matrix is a diagonal matrix with one or more scaling values.

9. The electronic device of claim 6, wherein combining the one or more force exerted on the one or more electrodes of the plurality of electrodes into the combined parameter comprises computing a norm of the one-dimensional vector.

10. The electronic device of claim 9, wherein computing the norm of the one-dimensional vector comprises an absolute norm, a Euclidean norm, a semi-norm, a maximum norm, an Lp norm, or a weighted norm.

11. The electronic device of claim 1, further comprising:

one or more sensors different from the plurality of electrodes;

wherein the processing circuitry further programmed to:

adjust the first threshold based on data from the one or more sensors.

12. The electronic device of claim 11, wherein adjusting the first threshold based on the data from the one or more sensors comprises fusion of data from a plurality of sensors.

13. The electronic device of claim 11, wherein the one or more sensors includes an accelerometer, a gyroscope, a force sensor different from the plurality of electrodes, a touch sensor, and/or a proximity sensor.

14. The electronic device of claim 11, the processing circuitry further programmed to:

adjust the first threshold based on information from a second electronic device in communication with the electronic device.

15. The electronic device of claim 1, the processing circuitry further programmed to:

in accordance with a determination that one or more second criteria are satisfied, the one or more second criteria including a criterion that is satisfied when the combined parameter is less than a second threshold, detect an unclick event.

16. The electronic device of claim 15, wherein the second threshold is based on the first threshold.

17. The electronic device of claim 16, wherein the second threshold is less than the first threshold by a predetermined percentage.

18. The electronic device of claim 15, further comprising:

one or more sensors different from the plurality of electrodes;

wherein the processing circuitry further programmed to:

adjust the second threshold based on data from the one or more sensors.

19. The electronic device of claim 1, the processing circuitry further programmed to:

detect a state of the electronic device;

in accordance with detecting the state of the electronic device is a first state, maintain the first threshold at a predetermined threshold; and in accordance with detecting the state is a second state, different from the first state, adjust the first threshold to a different threshold greater than the predetermined threshold.

20. A method comprising:

at an electronic device including a plurality of electrodes, sensing circuitry coupled to the plurality of electrodes and configured to sense one or more parameters at the plurality of electrodes, and processing circuitry coupled to the sensing circuitry:

capturing one or more parameters at the plurality of electrodes via the sensing circuitry;

processing the one or more parameters to account for one or more environmental variations or device-specific characteristics, wherein processing the one or more parameters includes generating one or more processed parameters;

determining a force exerted on each electrode of the plurality of electrodes based on the processed one or more parameters;

aggregating the force exerted on each electrode of the plurality of electrodes into a combined force parameter; and determining a state of the electronic device based on the combined force parameter.

* * * * *